US009870673B2

(12) United States Patent
Nanni et al.

(10) Patent No.: US 9,870,673 B2
(45) Date of Patent: Jan. 16, 2018

(54) SYSTEM AND METHODS OF MANAGING AND USING INFORMATION IN A LOTTERY SYSTEM

(71) Applicant: Ontario Lottery and Gaming Corporation, Toronto (CA)

(72) Inventors: Raymond Nanni, Sault Ste Marie (CA); Harold Tausch, Sault Ste Marie (CA); Leslie Norbo, Sault Ste Marie (CA); Ugo Cicchello, Sault Ste Marie (CA); Richard Guzzo, Sault Ste Marie (CA)

(73) Assignee: Ontario Lottery and Gaming Corporation, Toronto, Ontario (CA)

( * ) Notice: Subject to any disclaimer, the term of this patent is extended or adjusted under 35 U.S.C. 154(b) by 648 days.

(21) Appl. No.: 14/242,302

(22) Filed: Apr. 1, 2014

(65) Prior Publication Data
US 2014/0295945 A1 Oct. 2, 2014

(30) Foreign Application Priority Data

Apr. 2, 2013 (CA) .................................. 2811729

(51) Int. Cl.
*G07F 17/32* (2006.01)
*G06Q 20/40* (2012.01)
*G06Q 50/34* (2012.01)

(52) U.S. Cl.
CPC ..... *G07F 17/3241* (2013.01); *G06Q 20/4016* (2013.01); *G06Q 50/34* (2013.01)

(58) Field of Classification Search
CPC ............. G07F 17/329; G07F 17/3241; G06Q 30/0225

USPC ..................................................... 463/16–17
See application file for complete search history.

(56) References Cited

U.S. PATENT DOCUMENTS

| 2004/0039645 | A1* | 2/2004 | Walker ................. G06Q 10/087 705/16 |
| 2004/0148224 | A1* | 7/2004 | Gauthier ................ G06Q 30/02 705/14.23 |
| 2005/0001376 | A1* | 1/2005 | LaPorte ................ A63F 3/0665 273/269 |
| 2007/0055439 | A1* | 3/2007 | Denker ................. G01S 5/0036 701/532 |
| 2009/0167012 | A1* | 7/2009 | Martineck, Sr. ....... A63F 3/0665 283/67 |
| 2010/0222125 | A1* | 9/2010 | Nyman ................... G07F 17/32 463/17 |
| 2011/0295672 | A1* | 12/2011 | Dimitriadis ........... G06F 21/554 705/14.26 |
| 2012/0178513 | A1* | 7/2012 | Jackson ................ G07F 17/329 463/17 |
| 2013/0260856 | A1* | 10/2013 | Irwin, Jr. .............. G07F 17/329 463/17 |

(Continued)

*Primary Examiner* — Michael Cuff
(74) *Attorney, Agent, or Firm* — Shumaker & Sieffert, P.A.

(57) ABSTRACT

Interactions with the lottery system may be stored to a central database or data store. The transactions stored in the lottery system may represent interactions with the lottery system, such as purchasing of tickets and validating tickets. The lottery system may link a current transaction with a previous transaction, allowing a transaction profile of a ticket to be generated. The transaction profile information may be used for various purposes including supporting an investigation.

16 Claims, 8 Drawing Sheets

(56) References Cited

U.S. PATENT DOCUMENTS

2013/0260857 A1* 10/2013 Nordby ............... G07F 17/3255
    463/17
2014/0221083 A1* 8/2014 Okada ................ G07F 17/3237
    463/25
2014/0228087 A1* 8/2014 Skatter ................ G07F 17/329
    463/17

* cited by examiner

SYSTEM AND METHODS OF MANAGING AND USING INFORMATION IN A LOTTERY SYSTEM

This application claims priority to Canadian Application 2,811,729, filed Apr. 2, 2013. The entire content of Canadian Application 2,811,729 is incorporated herein by reference.

TECHNICAL FIELD

The current application relates to managing and using information in a lottery system, and in particular to linking transactions together to provide useful information in a claim investigation.

BACKGROUND

Lottery games may be administered by a central authority in accordance with local rules and regulations. The entity responsible for administering the lottery games may provide a number of games to the public. As an example, the lottery administration entity may provide sports related games that allow a player to wager on one or more sporting events, or may provide draw based lottery tickets or instant win type tickets. These types of games are only illustrative, and it should be appreciated that different types of games may also be offered. For example, a hybrid game may be offered that provides a combination of instant win tickets and draw-based tickets.

Regardless of the type of game a player decides to play, a ticket is commonly provided. The ticket may have a unique number, or unique combination of non-unique numbers, that associates the particular ticket information, such as the number of wagers or draws purchased, the predicted outcomes as well as any other additional information the lottery administering entity desires. In order to validate that a purchased ticket is a winner, the ticket may be scanned and the ticket information associated with the ticket retrieved and used to determine if the ticket is in fact a winner. Depending upon the size of the prize, a player may receive the prize directly from the retailer, or may be required to visit the administration entity in order to claim their prize.

The lottery administration entity typically maintains a retail network of terminals that can be used to purchase tickets as well as validate tickets. The retail terminals are commonly found at convenience stores, although they may be found in various locations. Each individual transaction at the retail locations, whether it is purchasing tickets or validating tickets, may be stored in a database or other data store. The data store may be used to search for ticket information, such as when or where a particular ticket was purchased.

It is desirable to have a lottery system that provides an improved, alternative or additional way to search for ticket related information.

SUMMARY

In accordance with an embodiment of the present disclosure there is provided a method for managing transaction information in a lottery system, the method comprising receiving, at a server, a transaction associated with an event in the lottery system, the transaction comprising a unique identifier (uTID) and transaction information associated with the event; determining if a type of the event associated with the received transaction is one of a plurality of pre-defined link-back event types; determining a previous related transaction associated with a unique identifier (uTID) from at least a portion of the transaction information when the type of the event is determined to be one of the plurality of predefined link-back event types; and storing, at the server, a link between the uTID of the transaction and the uTID of the related transaction.

The method may further comprise storing the received transaction comprising the uTID and transaction information.

The transaction information of the method may comprise a transaction type identifier indicating the type of the event, and wherein determining if the type of the event associated with received transaction is one of a plurality of predefined link-back event types comprises comparing the transaction type identifier against a set of link-back transaction type identifiers.

In the method, determining the previous related transaction may comprise determining a transaction type identifier associated with the link-back event type; and searching for the previous related transaction using the determined transaction type identifier associated with the link-back event type and at least the portion of the transaction information.

The link-back event type of the method may be a subset of a plurality of predefined possible event types for a transaction.

The link-back event type of the method may comprise one of: validation-to-original wager for linking a validation of a wager with the wager; free wager-to-validation for linking a free wager prize with validation of the wager winning the free wager; exchange-to-validation for linking an exchange wager to validation of the wager associated with the exchange wager; repurchase-to-validation for linking a repurchase of a wager to validation of the wager; promoX-to-promoY for linking a wager received as a promotion for buying another wager; cancel-to-original wager for linking a cancellation of a wager to the wager; reprint-to-original wager for linking a reprinting of a wager to the wager; and reissue-to-original wager for linking a reissuing of a wager to the wager.

The received transaction of the method may be received in real-time or near-real time from a retail location or wherein the received transaction is received from a batch of a plurality of transactions temporarily stored from a plurality of retail locations.

In accordance with an embodiment of the present disclosure there is further provided a method for supporting a prize investigation in a lottery system, the method comprising determining one or more previous transactions, each associated with a respective uTID, linked to a target uTID; determining any subsequent transactions, each associated with a respective uTID, linked to any of the respective uTIDs of the determined one or more previous transactions; retrieving transaction information associated with each non-duplicate uTIDs from a set of uTIDs comprising the target uTID, the respective uTIDs of the one or more previous transactions linked to the target uTID and the respective uTIDs of any subsequent transactions linked to any of the one or more previous transactions; and presenting at least a portion of the retrieved transaction information to an investigator.

The method of supporting the prize investigation may further comprise receiving a new transaction; and linking the new transaction to a previous associated transaction.

The method of supporting the prize investigation may further comprise managing transaction information of new transactions as described above.

In the method of supporting the prize investigation, linked transactions may be stored as a row in a linked transaction database table, the row associating a uTID to a linked uTID.

The method of supporting the prize investigation may further comprise receiving the target uTID or determining the target uTID from received transaction information.

In accordance with an embodiment of the present disclosure there is further provided a lottery information management system comprising: at least one processing unit for executing instructions; and at least one memory unit for storing instructions, the instructions when executed by the at least one processing unit configuring the system to provide a method for managing transaction information in a lottery system. The method comprises receiving a transaction associated with an event in the lottery system, the transaction comprising a unique identifier (uTID) and transaction information associated with the event; determining if a type of the event associated with the received transaction is one of a plurality of predefined link-back event types; determining a previous related transaction associated with a unique identifier (uTID) from at least a portion of the transaction information when the type of the event is determined to be one of the plurality of predefined link-back event types; and storing a link between the uTID of the transaction and the uTID of the related transaction.

The system may be further configured to store the received transaction comprising the uTID and transaction information.

In the system, the transaction information comprises a transaction type identifier indicating the type of the event, and wherein the instructions for configuring the system to determine if the type of the event associated with received transaction is one of a plurality of predefined link-back event types comprise instructions to configure the system to compare the transaction type identifier against a set of link-back transaction type identifiers.

In the system, the instructions for configuring the system to determine the previous related transaction may comprise instructions for configuring the system to determine a transaction type identifier associated with the link-back event type; and search for the previous related transaction using the determined transaction type identifier associated with the link-back event type and at least the portion of the transaction information.

In the system, the link-back event type may be a subset of a plurality of predefined possible event types for a transaction.

In the system, the link-back event type may comprise one of validation-to-original wager for linking a validation of a wager with the wager; free wager-to-validation for linking a free wager prize with validation of the wager winning the free wager; exchange-to-validation for linking an exchange wager to validation of the wager associated with the exchange wager; repurchase-to-validation for linking a repurchase of a wager to validation of the wager; promoX-to-promoY for linking a wager received as a promotion for buying another wager; cancel-to-original wager for linking a cancellation of a wager to the wager; reprint-to-original wager for linking a reprinting of a wager to the wager; and reissue-to-original wager for linking a reissuing of a wager to the wager.

In the system, the received transaction may be received in real-time or near-real time from a retail location or wherein the received transaction is received from a batch of a plurality of transactions temporarily stored from a plurality of retail locations.

The system may further comprise instructions for configuring the system to provide a method for supporting a prize investigation in a lottery system comprising determining one or more previous transactions, each associated with a respective uTID, linked to a target uTID; determining any subsequent transactions, each associated with a respective uTID, linked to any of the respective uTIDs of the determined one or more previous transactions; retrieving transaction information associated with each non-duplicate uTIDs from a set of uTIDs comprising the target uTID, the respective uTIDs of the one or more previous transactions linked to the target uTID and the respective uTIDs of any subsequent transactions linked to any of the one or more previous transactions; and presenting at least a portion of the retrieved transaction information to an investigator.

In the system, linked transactions may be stored as a row in a linked transaction database table, the row associating a uTID to a linked uTID.

The system may further comprise instructions for configuring the system to receive the target uTID or determine the target uTID from received transaction information.

BRIEF DESCRIPTION OF THE DRAWINGS

Embodiments are described herein with references to the appended drawings, in which.

DETAILED DESCRIPTION

Lottery games may include different types of game play, such as sports wagers, draws and instant win games. Regardless of the type of the game, a player purchases a ticket, typically from a retail location. The ticket may be associated with a unique identifier that can be subsequently used to determine if the ticket is a winner. The unique identifier may be associated with game and ticket information, which may vary depending upon the game played. For example for lottery draw tickets, the ticket information may include an indication of the selected numbers that can then be checked against the actual numbers drawn. As will be appreciated, numbers are typically drawn; however, other types of symbols, colours or objects could be used in place of numbers. For sports wager tickets, the ticket information may include an indication of which sporting matches are being wagered on as well as the outcomes. For instant win tickets, the ticket information may provide an indication of the prize of the ticket. Although the tickets are described as having a unique identifier that is used to associate the physical ticket with the ticket information, it is possible that the physical ticket itself includes the ticket information encoded on it. Regardless of if the ticket information is directly encoded onto the ticket, or if it is associated with the ticket through a ticket identifier, it typically can be retrieved by scanning a barcode on the ticket.

Interactions with the lottery system may be stored to a central database or data store. The transactions stored in the lottery system may represent interactions with the lottery system, such as purchasing of tickets and validating tickets. As described further herein, the lottery system may link a current transaction with a previous transaction, allowing a transaction profile of a ticket to be generated.

The transaction profile can be used in investigating a prize claim. That is, when a ticket having a large prize is claimed, the ticket may be investigated in order to identify potential problems with tickets or to verify information provided by the individual claiming the prize. As described further below, this may be used to indirectly to verify that the person claiming the prize is the rightful owner of the winning ticket, despite the fact that there is no direct link between the person and the ticket.

Figure 1:
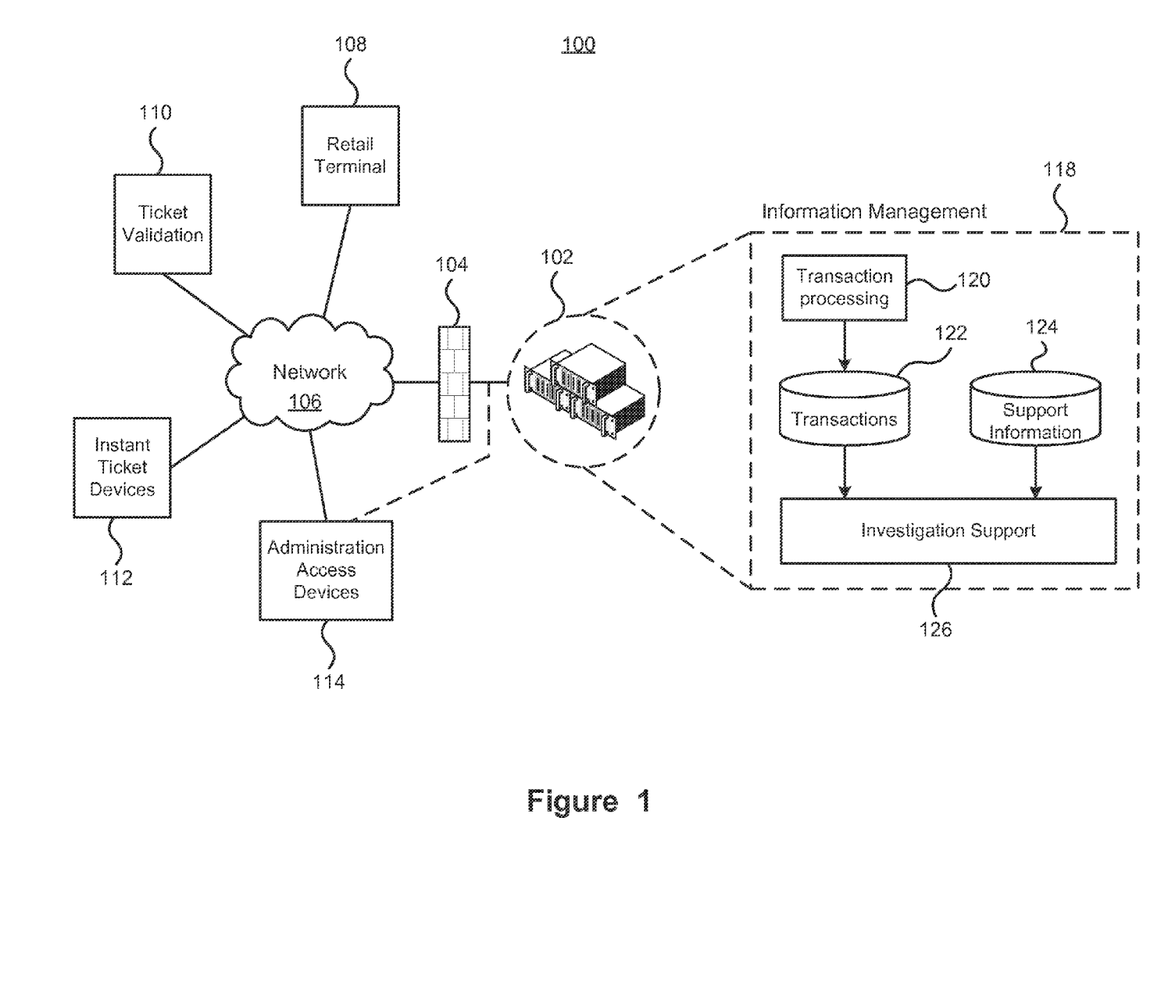
FIG. 1 depicts an information management system within a lottery system.

FIG. 1 depicts an information management system within lottery system. The lottery system 100 comprises a plurality of interconnected components. A computing system 102 is depicted as providing a central location for storing and processing of lottery system information. The computing system 102 may be provided by one or more physical computers, each comprising at least one processor for executing instructions stored in an associated memory. The computing system may be secured from unauthorized access through one or more components including a firewall 104 that controls the flow of information between an internal network and the external network 106. Although described as being provided at a single location, the computing system may be provided by a number of computing systems coupled together by a secure connection. Alternatively still, one or more backup and/or failover computing systems may be provided in order to provide for a highly available computing system.

A plurality of external devices can communicate and interact with the computing system 102 over the network 106. For example, retail terminals 108, which are provided at various retail locations for the purchase and validation of tickets, can communicate with the computing system 102. The retail terminals 108 may communicate with the computing system 102 in order to send and receive ticket information, whether it is in regards to tickets that are being purchased, validated, redeemed, exchanged or cancelled. Additionally, ticket validation devices 110 may be provided in various locations. The ticket validation devices 110 allow a ticket to be validated in order to determine if it is a winner or not.

In addition to the retail devices 108, 110 for purchasing and validating tickets, the lottery system 100 may further comprise instant win devices 112. As will be appreciated, instant win tickets typically comprise scratch tickets that are printed at a location and distributed to the retailers. The instant win tickets are typically distributed to retailers in a number of packs of tickets. Each pack must be activated before the ticket can be sold and redeemed. Further the packs are tracked as they are distributed. The tracking and activation information may be provided by the instant win ticket devices 112. The instant win devices 112 may comprise handheld devices with a barcode scanner or image capture device for capturing the tracking information and communicating it to the computing system 102, allowing the packs of tickets to be tracked and activated.

Administrative access devices may be used to communicate with the computing system 102. The administrative access devices may be a typical computing device such as a laptop, personal computer, tablet computer or smartphone. The administration access devices allow administrative tasks to be accomplished, such as controlling user access, maintaining support information such as insider information and retailer information. The administrative access devices 114 may be located either on an external side of the firewall 104 or on the internal side.

Various information can be generated and stored by the lottery system 100. Further each interaction with the computing system may generate a transaction that is stored. The transaction information may be stored in order to meet regulatory requirements, business objectives, gaming requirements, or other requirements. As described further herein, transactions associated with certain ticketing events may be processed in order to link a transaction with a previous transaction. The linked transaction information may also be stored and subsequently used to provide a transaction profile of a ticket, which may facilitate easy investigation of a ticket and may also enable a lottery administration entity to provide new features, such as reprinting of lost tickets as well as verification of purchasers for large prize tickets.

The transaction linking and generation of a ticket's transaction profile may be done by information management functionality 118 provided by the computing system 102. The information management functionality 118 includes functionality for processing transactions 120. The transaction processing functionality 120 may include functionality for receiving and storing transactions. For example, when a player purchases a ticket from a retailer, a transaction can be generated and the transaction processing functionality may receive the transaction and store it in a transaction database 122. The transaction processing functionality 120 may further attempt to link a received transaction to one or more previous transactions. The linked transaction information may also be stored in the transaction database 122. In addition to the transaction database 122, the information management functionality 118 may also provide a support information database 124 which may store additional information, such as administrative information, information on retailers, game descriptions, or other information that may be desirable to store. The information stored in the transaction database 122, and possibly the support information database 124, may be accessed by investigation support functionality 126. The investigation support functionality 126 may generate the transaction profile of a ticket under consideration. The transaction profile, generated using the linked transaction information, may be used to help in identifying a specific ticket, verifying a purchaser of the ticket or other purposes as desired.

Figure 2:
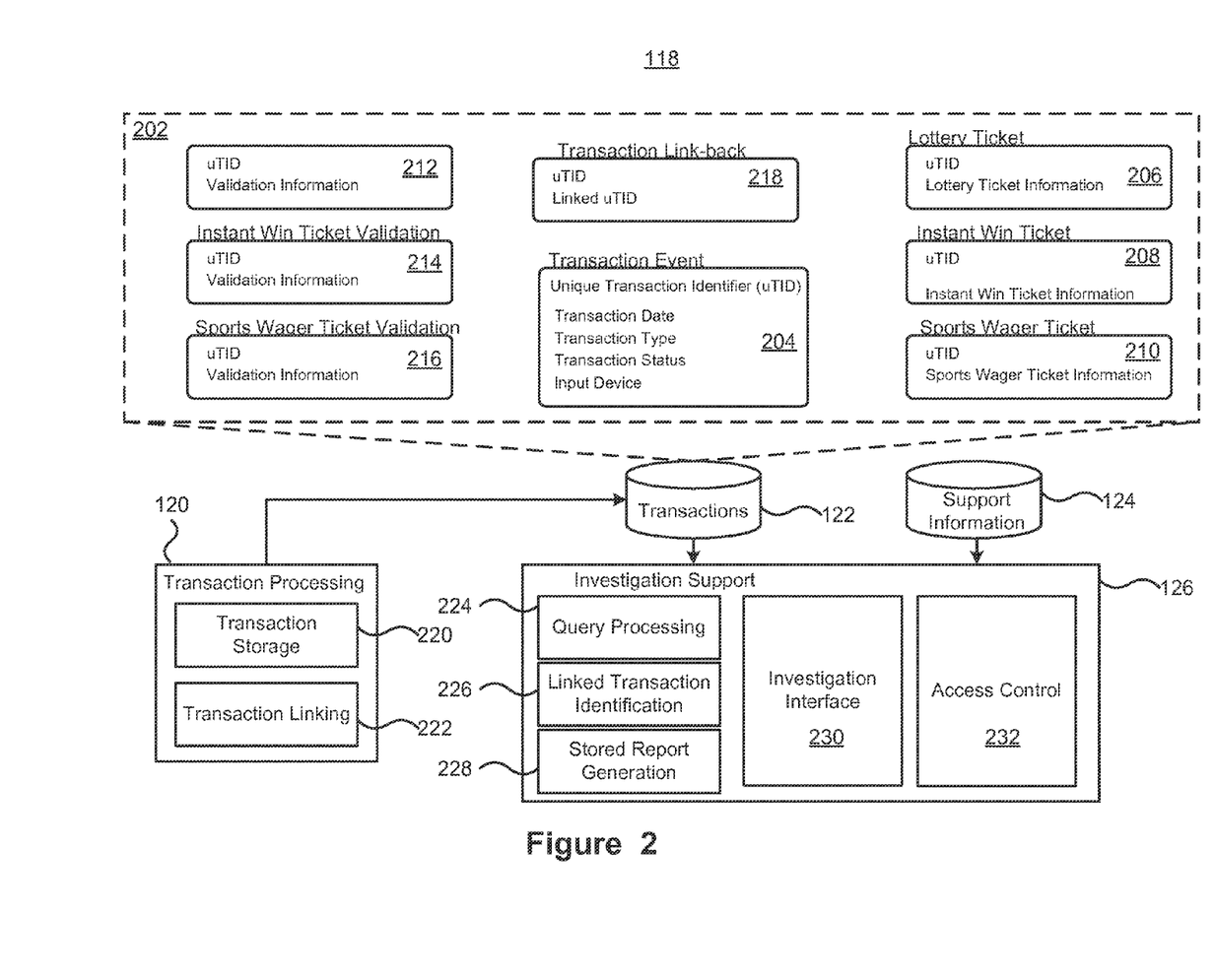
FIG. 2 depicts components of an information management system.

FIG. 2 depicts components of the information management system functionality. As described above, the information management functionality 118 comprises transaction processing functionality 120, a transactions database 122, a support information database 124 and investigation support functionality 126. As depicted, the transaction database 122 may store the transaction information according to a data model 202. As depicted, the data model centers around a transaction event used to capture the common information of a transaction. A transaction is associated with an event in the lottery system. Different types of events, and so different types of transactions, are possible. For example, generating a new lottery ticket may be an event type that generates a corresponding transaction. Similarly, validating the lottery ticket may be another event type that generates a corresponding transaction. Broadly, ticket related transactions are grouped into generation events and validating events. The different generation events may further be grouped based on the type of ticket generated, such as whether it is the purchase of a draw lottery ticket, the purchase of an instant win ticket, or the purchase of a sports wager ticket. Further generation events, and corresponding transactions, may include the reprinting of tickets, reissuing of tickets, cancelling of tickets, and generation of an exchange ticket. Tickets may be reprinted if for example the numbers of have become illegible, or the ticket is ripped or otherwise compromised or if there was a problem with the initial. Tickets may be cancelled, for example if a ticket was purchased in error, or if a ticket is lost. Cancelling tickets may have other restrictions such as only being able to do so on the same day the ticket was purchased and before the draw has occurred. An exchange ticket may be generated in situations where the ticket comprises a plurality of draws and one of the draws has concluded, and so a prize may be redeemed, while another draw on the ticket has not concluded. In such situations, the prize for the completed draw can be awarded, and the original ticket exchanged for another ticket with only the remaining un-concluded draws on the ticket.

As depicted, a transaction event table 204 may store information common to all transactions. The information includes a unique transaction identifier (uTID for brevity). The uTID is used to uniquely identify a particular transaction, and may also be used to associate additional information with the transaction. The transaction event table 204 may store additional information for each event. For example, it may store a date and time of the transaction, a type of the transaction, a status of the transaction and an input device that generated the transaction.

The uTID of a transaction can be used to associate the transaction event with specific information of the transaction according to the type of event that generated the transaction. The additional information may be stored in respective tables. As depicted, a lottery ticket table 206 may store a uTID and the lottery ticket information of the ticket. The lottery ticket information may include information specific to the draw based lottery ticket, such as the number of boards played, the selected numbers of each board, whether the numbers were selected by the lottery system or by the purchaser, whether the ticket is a new ticket, a re-purchase ticket where a player re-purchases the same selected numbers after validating a ticket, or whether the transaction is for cancelling a particular ticket. The lottery ticket information may include further information such as a retailer identifier identifying the location of the ticketing event and any other information desired by the lottery administration entity.

An instant win ticket table 208 stores transaction information associated with instant win lottery tickets. The instant win lottery tickets are typically scratch-off tickets. The instant win lottery ticket table 208 may store uTIDs of transactions and associated instant win ticket information. The instant win ticket information may include information about the type of game, the prize of the ticket as well as pack and activation information.

A sports wager ticket table 210 stores transaction information associated with sports wager tickets. The table 210 may store uTIDs of transactions and associated sports wager ticket information. The sports wager ticket information may include information about the type and amount of the wager, as well as specifics about the wager, such as the selected winners.

Separate ticket validation tables 212, 214, 216 may store validation information associated with validation events for draw based lottery tickets, sports wager tickets and instant win tickets. The validation information for each ticket type may provide information on the validation of tickets, such as where the ticket was validated, the result of the validation and the amount of the prize awarded.

In addition to the core transaction information, the ticket information and the validation information, the transaction database 122 may further comprise a transaction link-back table 218. As described further, the transaction link-back table may associate a uTID of a transaction to a uTID of a linked transaction. The linked transaction is an associated transaction. As an example, a transaction for validating a ticket may be linked back to the transaction associated with the purchase of the ticket.

As described above, the support information database 124 may store information in addition to the transaction information stored in the database 122. The support information database 124 is not described in detail herein; however, it may store information such as descriptions on the type of lottery games, information on employees of the lottery administration entity as well as retailer information and other 'insider' information of people that may be ineligible from playing lottery games. The support information may further comprise information on retailer audits or investigations as well as complaints filed against retailers.

The information management functionality 118 further comprises the transaction processing functionality 120. The transaction processing functionality 120 comprises transaction storage functionality 220 that can receive a transaction or transaction information from retail locations or other locations within the lottery system 100. Once the transaction storage functionality 220 receives the transaction, or transaction information, it stores the transaction in the transaction database 122. In addition to the transaction storage functionality 220, the transaction processing functionality 120 further comprises transaction linking functionality 222. The transaction linking functionality 222 may receive transactions or transaction information, determine a previous transaction associated with the received transaction and then store the linked transactions together in the transaction link-back table 218. The transaction link-back table allows linked transactions to be quickly determined, allowing all events associated with a ticket to be quickly determined, retrieved and presented to a user.

The information management functionality 118 further comprises investigation support functionality 126. The investigation support functionality 126 comprises access control functionality 232 for controlling access to the investigation interface. The access control functionality 232 may control the access through the use of, for example, user name and password verification. The access control functionality 232 may utilize information stored in the support information database 124, such as employee names, user names, passwords, position and clearance to control the functionality provided to different users.

The investigation interface functionality 230 provides an interface to users for accessing the information stored in the transaction information database 122, as well as the support information database 124. The investigation interface functionality 230 may utilize query processing functionality 224 for retrieving information from the databases 122, 124. Linked transaction identification processing functionality 126 may provide functionality for processing transaction information from the link-back transaction table 218 in order to determine all linked transactions. The investigation support functionality may further comprise stored report generation functionality 228 for generating stored reports of the information in the transaction database 122 and the support information database 124.

The transaction processing functionality 120 receives transaction information associated with events in the lottery system 100 such as purchasing tickets, validating tickets, entering retailer complaints, as well as other events for which transaction information is stored. Depending upon the type of the transaction, it may be linked to previous, and related, transactions. The investigation support system may allow the transaction information to be easily viewed, including all linked transactions associated with a single ticket. As a result, it is possible to quickly view all events associated with a ticket. This information may be used for various reasons, such as identifying a ticket to cancel or reissue, and verifying a likely purchaser of a ticket.

Figure 3:
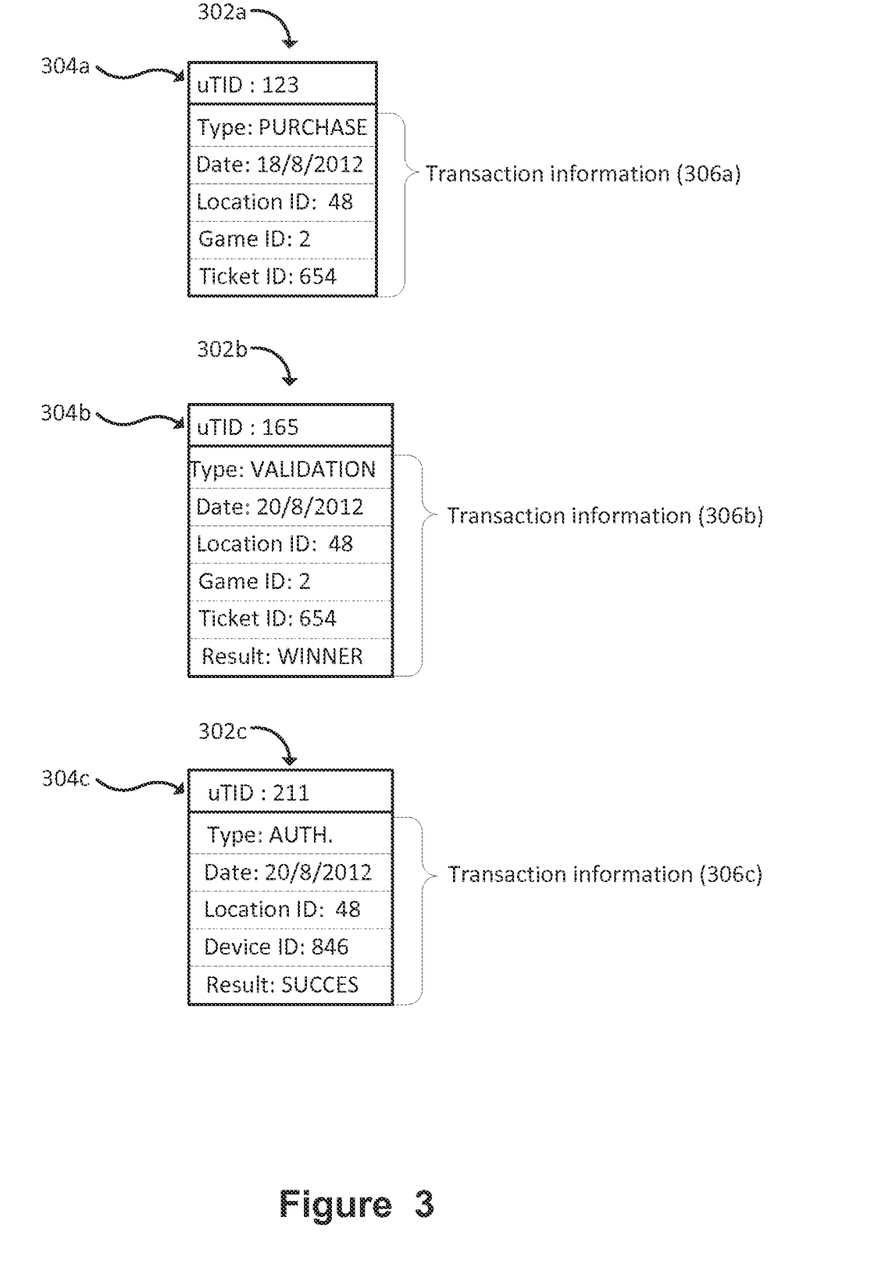
FIG. 3 depicts representations of illustrative transactions.

FIG. 3 depicts representations of illustrative transactions. Three different transactions 302a, 302b, 302c (referred to collectively as transactions 302) are depicted. Three different types of transactions are depicted. Each of the transactions 302 comprise a respective unique transaction identifier (uTID) 304a, 304b, 304c (referred to collectively as uTIDs 304) and respective transaction information 306a, 306b, 306c (referred to collectively as transaction information 306). The uTIDs 304 each uniquely identify a transaction and can be used in retrieving the associated transaction information 306. Each transaction may have common information, such as the transaction type, the date and/or time of the transaction and a location identifier, identifying the location of the transaction such as a particular retail location.

The first transaction 302a is depicted as a PURCHASE type transaction, which may be generated when a consumer purchases a new ticket, whether it is a lottery ticket, a sports wager ticket, an instant win ticket or other types of ticket. When a ticket is purchased, the transaction generated may include transaction information 306a that includes common transaction information, such as the transaction type, date and location ID as well as ticket specific information. It will be appreciated that the particular ticket specific information required to be stored may be dependent upon requirements of the different lottery administration entities and the particular ticket purchase. As an example, the ticket information is depicted as including a game identifier, which may identify the particular game type of the ticket and a ticket identifier that can be used to uniquely identify the ticket.

The second transaction 302b is depicted as a VALIDATION type transaction. The validation transaction may be generated when a consumer validates a purchased ticket at a ticket scanner, retail location or prize center. The transaction information 306b may include information identifying the ticket being validated such as the game ID and ticket ID as well as the result of the validation. The validation result is depicted as simply indicating if the ticket is a winner or not, although the result information may include additional information describing the actual prize won, such as a cash prize amount, a free ticket, or other prizes of the game. A portion of the transaction information, such as the game ID and ticket ID, may be used to locate the PURCHASE transaction 302a of the validated ticket.

The third type of transaction 302c is a non-ticket related transaction. That is, the transaction does not involve an event associated with a ticket. It may be viewed as an administrative event. For example retail terminals may be required to periodically authorize, or re-authorize their communication channel with the central location. The third transaction 302c is depicted as being an authorization (AUTH) type transaction. The transaction information 306c may include for example a device identifier that uniquely identifies the terminal device and the result of the authorization.

Figure 4:
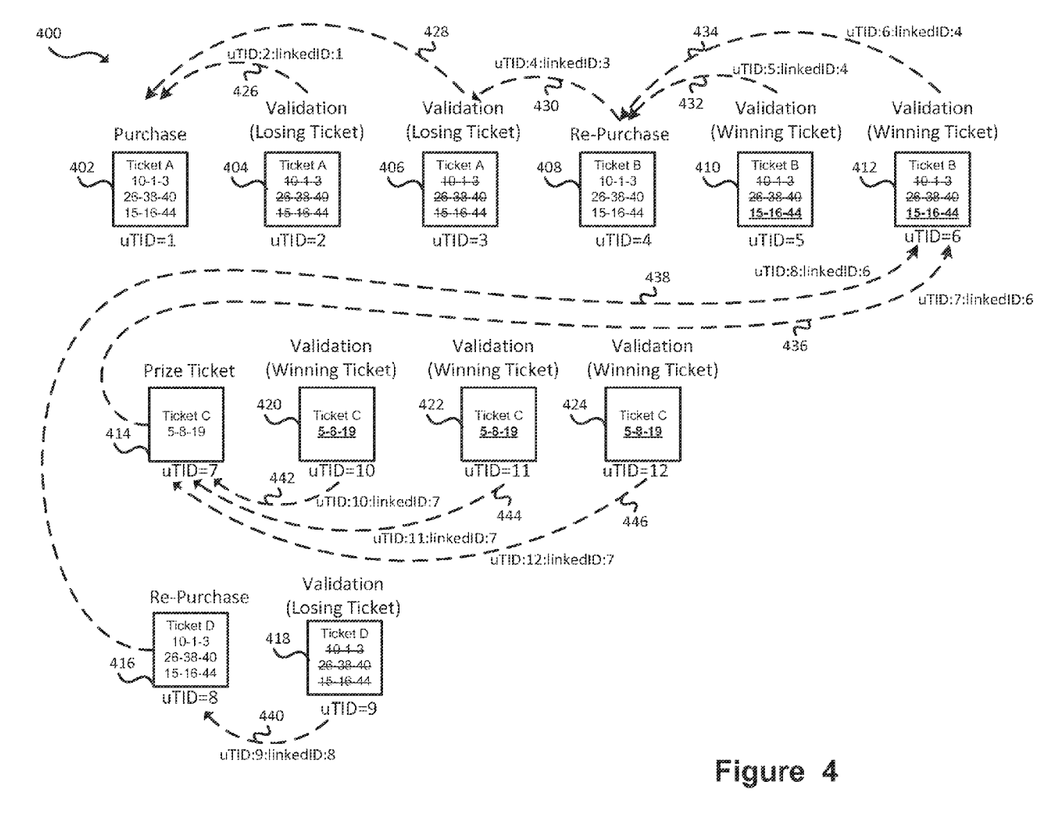
FIG. 4 depicts a plurality of linked transactions.

FIG. 4 depicts a plurality of linked transactions. The plurality of transactions depicted can be linked back to an initial ticket purchase and together can form a transaction profile 400. The transaction profile provides information on each event throughout the 'life' of a ticket. This information may be used to help verify a purchaser of a ticket. Typically, in lottery games the physical ticket has been all that is required to redeem the ticket for the prize. As such, if a ticket is lost by the original purchaser, and subsequently wins, the purchaser will be unable to collect the prize. Further, if the ticket is subsequently found by another person and attempted to be redeemed, the transaction profile may be used by a claim investigator in verifying the purchaser. For example, the person who purchased the ticket would likely know where they purchased the ticket and where they validated the ticket, while the person that found the ticket would likely not know this information.

The transaction profile 400 begins when a new lottery ticket is purchased. Transaction 402 represents the original purchase of the ticket. As depicted, Ticket A is a lottery ticket that includes 3 'boards' or selections for the draw. After the draw of the winning lottery numbers, the purchaser validates the ticket. This validation generates a transaction 404 indicating that the ticket was a loser. When the transaction 404 is received at the computing system, the transaction information is used to locate the previous transaction 402 associated with the purchase of the ticket, and a link 426 between the two transactions is stored. Upon validating the ticket the consumer may choose to keep the loosing tickets, and at some time later validates the ticket again, generating another validation transaction 406. The second validation transaction 406 is linked 428 back to the original purchase transaction 402. A consumer may validate a losing ticket twice for comfort in ensuring that it is in fact a loser, or out of habit. At the time of the second validation, the consumer may wish to re-purchase the ticket, which again generates a new transaction 408. The re-purchase of a ticket provides a simple way for consumers to re-play the same numbers or selections. The re-purchase transaction is linked 430 to the validation transaction 406 from which the ticket was re-purchased. The consumer again validates the ticket which generates a validation transaction 410 that is linked 432 back to the re-purchase ticket transaction. As depicted, the validation of the re-purchase ticket indicates that the ticket has a winning board. The consumer may not redeem the ticket right away, and as such the ticket is again validated at a later time. The second validation generates an associated transaction 412, which is linked 434 to the re-purchase transactions 408. Upon the second validation, the consumer decides to again re-purchase a ticket, which generates a re-purchase transaction 416 that is linked 438 back to the validation transaction 412. It is assumed for the sake of the description that the validation 412 indicates that the consumer won a free game ticket, which is redeemed resulting in transaction 414. The transaction 414 associated with the prize ticket is linked 436 back to the validation transaction 412. The consumer may subsequently validate the new tickets. The re-purchase ticket is validated, generating a transaction 418 indicating that the ticket is a loser that gets linked 440 back to the re-purchase transaction 416. The consumer may then validate the prize ticket, which generates a validation transaction 420 that gets linked 442 back to the prize ticket transaction 414. As depicted the user subsequently validates the prize ticket a number of times, generating a respective validation transaction 422, 424 each time. The validation transactions get linked 444, 446 back to the prize ticket transaction 414. It is assumed that the validation of the prize ticket indicated that it was a winner of a relatively large prize amount, which may explain why the consumer validated the ticket a number of times, but didn't validate the losing ticket a number of times as had been done with their previous tickets.

As will be appreciated, each transaction may include, or be linked to, additional information such as the location the transaction took place, the date and time of the transaction. By linking related transactions together, a profile of the ticket's history can be created. The ticket history may be used to verify that the ticket was purchased by a consumer, allowing the purchaser of a winning ticket to be awarded the prize value, even if the ticket were lost and found by someone else.

As described above, certain transactions that are associated with ticketing events may be linked back to previous transactions. The type of transaction may indicate what type of transaction it will be linked back to. For example, a validation transaction may be linked back to a ticket generation transaction, whether from a purchase, re-purchase or prize. Different link-back types may be used to link different transaction types. For example, a validation-to-original wager link-back type may link a validation transaction of a ticket to the transaction associated with the generation of the ticket. A free ticket-to-validation link-back type may link a prize ticket transaction with the validation transaction of the winning ticket. An exchange-to-validation link-back may link an exchange ticket transaction to a validation transaction of the ticket associated with the exchange ticket. An exchange ticket may be provided when a ticket has multiple boards, one of which has concluded, such as an instant win game and one of which has not concluded such as a later occurring draw. An exchange ticket may be issued for the non-concluded games. A repurchase-to-validation link-back may link a repurchase of a ticket transaction to a validation transaction of the ticket. A promoX-to-promoY link-back may link a ticket transaction of a ticket received as a promotion for buying another ticket to the ticket transaction of the other ticket. The promotion may give a consumer a free game ticket if they purchase a particular other ticket. A cancel-to-original ticket link-back may link a cancellation transaction of a ticket to the ticket transaction. Tickets may be cancelled if for example they are lost, or for refunds. A reprint-to-original ticket link-back may link a reprinting transaction of a ticket to the ticket transaction. A reissue-to-original ticket transaction may link a reissuing transaction of a ticket to the ticket.

Figure 5:
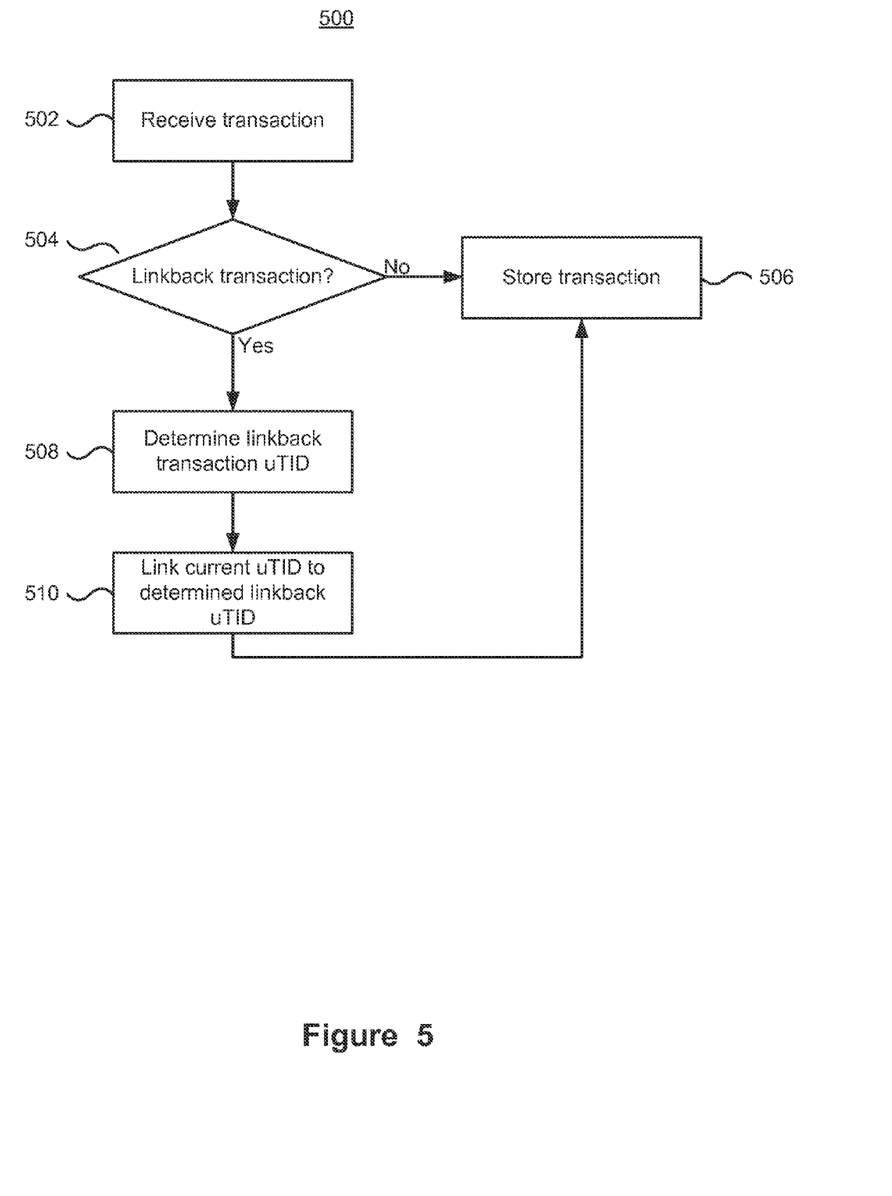
FIG. 5 depicts a method of linking transactions.

FIG. 5 depicts a method of linking transactions. The method 500 may be provided by the transaction linking functionality 222 described above with regards to FIG. 2. The method 500 begins with receiving a transaction (502). As described above, a transaction comprises a unique transaction identifier uTID and associated transaction information. The transaction may be received in real-time, or near real-time, from a retail location. Alternatively, the transactions may be periodically processed in batches. For example, the transactions may be temporarily stored, for example for an hour, multiple hours, a day or even multiple days, and then processed in a batch. Regardless of how each transaction is received, each transaction is eventually processed. Once the transaction is received, it is determined if the transaction is a link-back transaction (504). The transaction may be determined to be a link-back transaction based on the transaction type. The method may compare the type of the transaction to a plurality of transaction types that are link-back transaction types. The transaction type may be provided as a string or identifier associated with a transaction type. If the transaction is not a link-back transaction (No at 504) then the transaction is stored (506). If the transaction is a link-back transaction (Yes at 504), the method determines the uTID of the previous transaction the current transaction should be linked to (508). The link-back transaction may be determined from a portion of the transaction information, as well as the type of the transaction. The type of the transaction may be used to determine what type of transaction it is linked back to, for example a re-purchase transaction is linked back to a validation transaction. The portion of the transaction information can then be used to determine the previous transaction. The portion of the transaction information used to determine the previous transaction may uniquely identify the ticket that is related to both transactions. Once the associated link-back transaction is determined, the uTID of the current transaction is linked to the uTID of the link-back transaction (510). The uTIDs may be linked together by storing them together in a row of the transaction link-back table 218 described above. The once the transactions are linked, the current transaction may be stored (506).

As described above, as new transactions are stored in the transaction database, they are processed in order to determine if there is a previous transaction associated with the current transaction. The generated linking information facilitates the subsequent generation of a transaction profile of a ticket.

Figure 6:
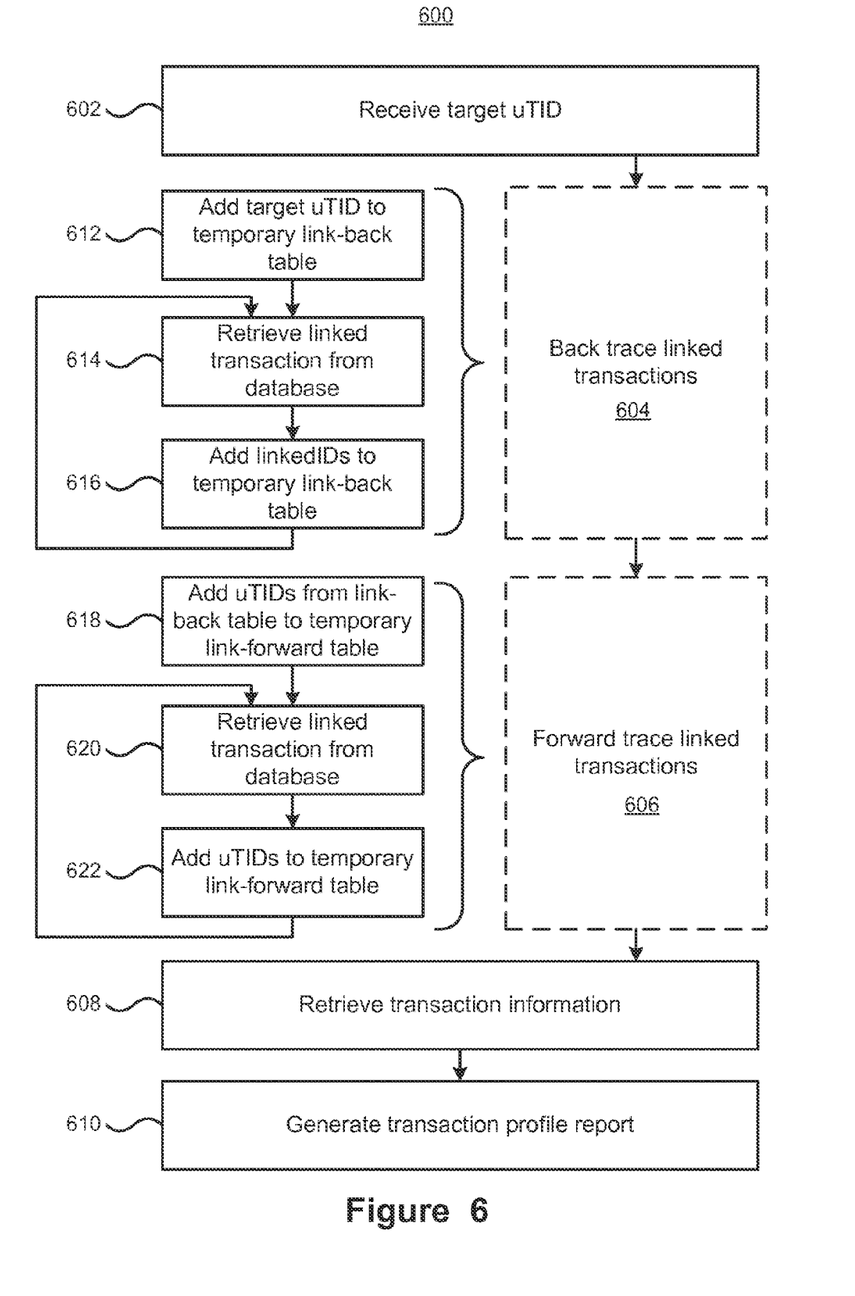
FIG. 6 depicts a method for use in investigating a prize claim.

FIG. 6 depicts a method for generating a transaction profile. The transaction profile may be used for various reasons, such as verifying a particular ticket in order to cancel a lost ticket, or to verify that the person redeeming a large prize ticket purchased it, or to resolve ownership claims over a winning ticket. The method 600 may be provided, at least in part, by the linked transaction identification functionality 226 described above. The method receives a target uTID (602) that identifies a transaction under consideration. The uTID may be received directly, or information may be received that in turn is used to locate the uTID. For example, the information may comprise ticket purchase date, time and location as well as other additional ticket identifying information. Once a target uTID is received, the linked transactions are back traced (604) to identify previous transactions that were linked to the target uTID. Once the previous transactions are located, these transactions are forward traced (606) to locate all transactions linked with the target uTID. Once all backward and forward linked transactions are located, respective transaction information of the transactions is retrieved (608) and a transaction profile report generated (610). The generated report presents the transaction profile to a user. The transaction profile report may be presented as text, as graphics or a combination of the two. Further, the report may be a static report or may be an interactive report.

The back tracing of the linked transactions (604) can be achieved in various ways, one of which is depicted in FIG. 6. The target uTID is added to a temporary link-back table (612), which is initially empty. The transactions linked to the target uTID in the temporary link-back table are then retrieved from the database (614). Assuming that the database stores links as pairs of uTIDs:linked uTIDs, the linked uTIDs can be retrieved by searching the table for all rows which have a uTID matching the target uTID. The retrieved linked uTIDs are added to the temporary link-back table (616) and the process of locating and adding linked transactions to the link-back table continues with using the next entry in the link-back table as the target uTID. Once no more entries are left to process in the temporary link-back table the method may then forward trace all of the linked transactions.

The forward tracing of the linked transactions (606) can be achieved in various ways, one of which is depicted in FIG. 6. The forward tracing of linked transactions is similar to the backward tracing described above, however rather than matching the target uTID to the stored uTID it is matched to the linked uTID. The uTIDs from the temporary link-back table are added to a temporary link-forward table. Depending upon the constraints placed on how transactions are generated, for example if a transaction can only be linked to a single previous transaction, it may not be necessary to add all of the uTIDs from the back-trace table. Instead, the uTID of the first transaction may be added.

Once the uTIDs are added to the temporary link-forward table, the uTIDs of the forward linked transactions are determined (620) and added to the temporary forward link table (622). The forward linked transactions may be located by searching the stored linked transactions using the target uTID to match to the linked uTID and retrieve the associated uTID. The temporary link forward table is processed until no more entries need to be processed. The temporary link-forward table and the temporary link-back table may be combined and duplicate uTIDs culled from the combined table to provide a list of uTIDs that are associated with the received target uTID.

Figure 7:
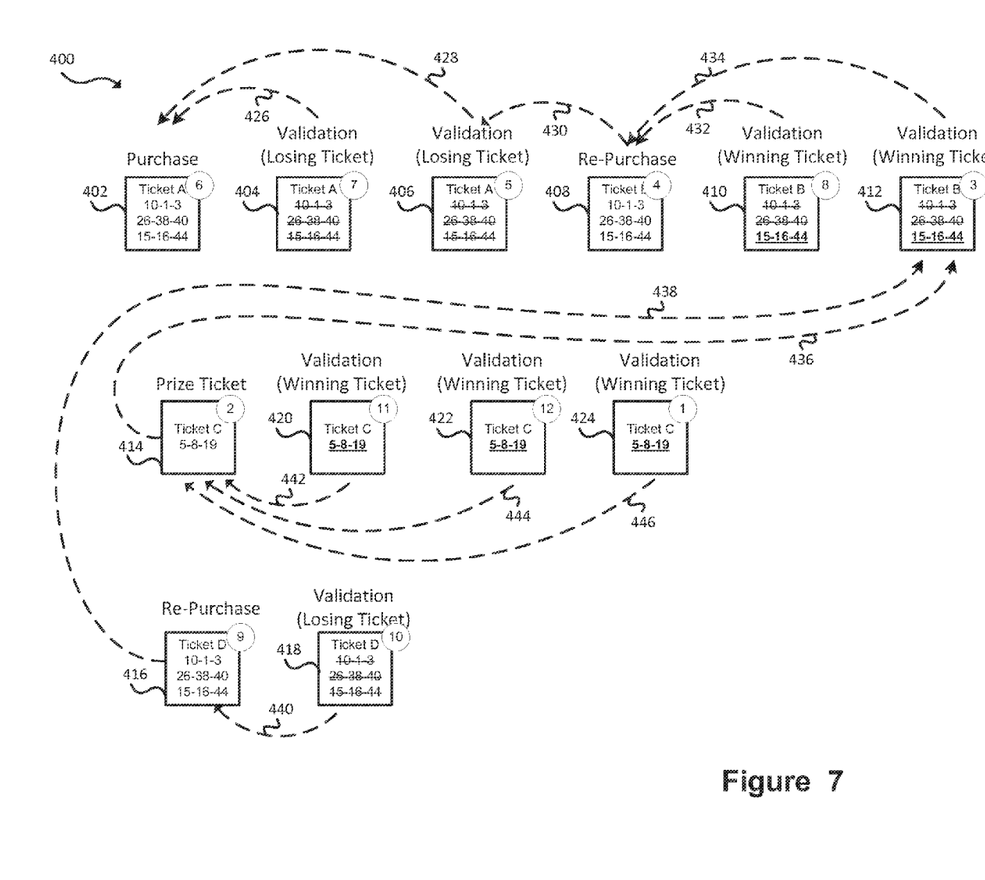
FIG. 7 depicts a sequence of discovery of linked transactions.

FIG. 7 depicts a sequence of discovery of linked transactions. The transactions are the same as described above with respect to FIG. 4. It is noted that the order of discovery is indicated with a number in a circle on each transaction. An initial transaction may be the last validation transaction 446. Once this uTID is known, the links are traced backward to locate associated transactions. As depicted this process locates the prize ticket transaction 414, then the validation transaction 412, of the winning ticket that awarded the ticket, then the re-purchase transaction 408, then the validation transaction 406 of the losing ticket and finally the purchase transaction 402 of the original ticket.

As is clear from the Figure, only a portion of related transactions is discovered in the back tracing portion. Next the transactions are forward traced to locate all related transaction. The forward tracing would locate the additional transactions. Starting from the original ticket purchase transaction 402, the forward tracing would locate the first validation transaction 404 of the losing ticket, and then would locate the previously discovered validation and re-purchase transactions. From the re-purchase transaction, the forward transaction would locate the first validation transaction 410 of the winning ticket. The forward tracing would continue onto the previously located validation transaction 412, which would locate for the first time the re-purchase transaction 416 and from that transactions the validation transaction 418. From the validation transaction (412) of the winning ticket, the forward tracing would also locate the first and second validation transactions 420, 422 of the prize ticket.

As should be evident, the storage of the linked transaction information facilitates the identification of related transactions, which can be used to quickly generate a transaction profile of all of the ticket events associated with the particular ticket. This information may be used in various manners. As an example, the ticket profile may be used to establish or verify the owner of a winning ticket. A consumer may play the same numbers for several years, and establish a habit of purchasing the ticket from the same retailer or in the same general area and always re-purchases the ticket. If this consumer loses the ticket and their numbers subsequently win a relatively large prize, the consumer may wish to attempt to claim their prize. If another person finds the lost winning ticket and attempts to redeem it, a transaction profile can be used to determine the real owner of the ticket. The actual purchaser will be able to describe where they purchased the ticket and the history of play, such as that the ticket is a re-purchase. The person who found the ticket would likely be unable to provide any of the information from the transaction profile.

The example described above is only one example of the possible uses of the transaction profile information.

Figure 8:
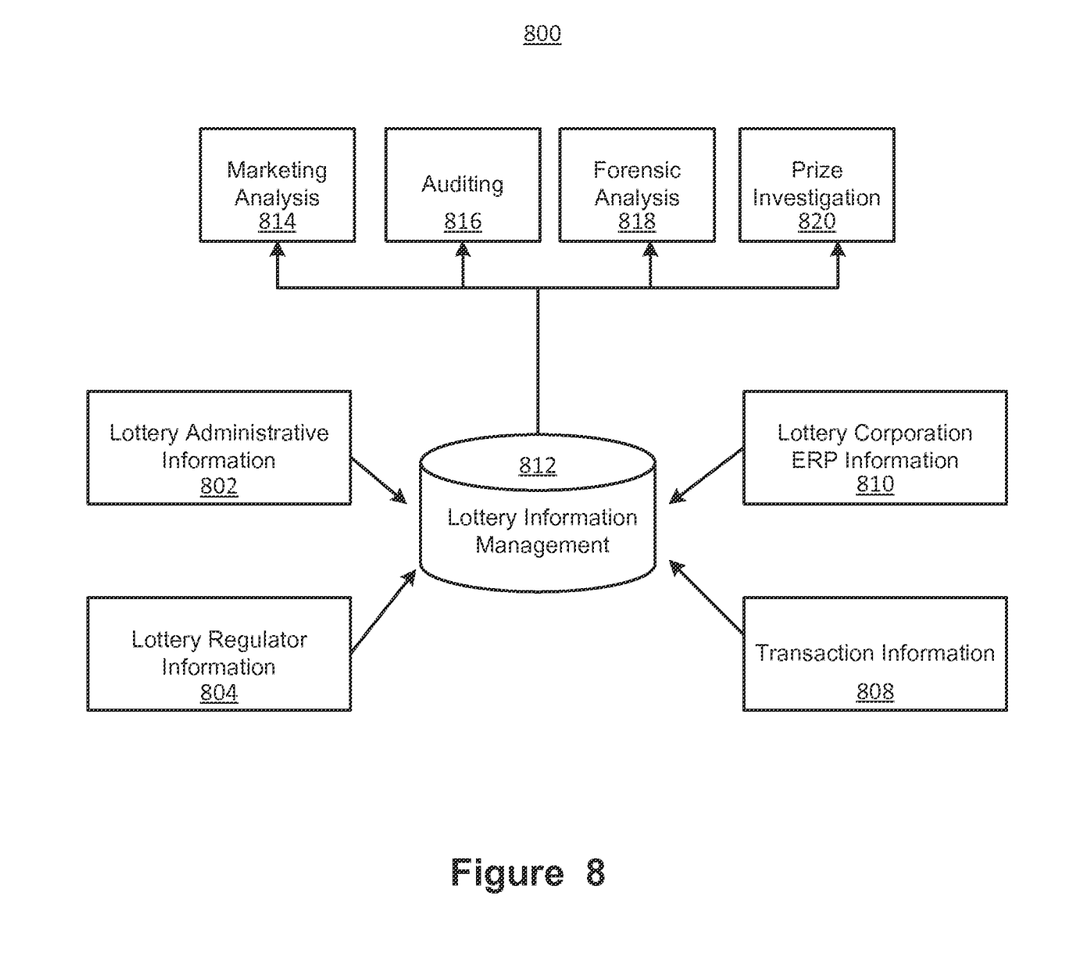
FIG. 8 depicts components of a lottery system.

FIG. 8 depicts components of a lottery system. The lottery system 800 comprises a central lottery information management system 812 that provides centralized access to a number of different information stores. As depicted, the lottery information management store 812 may receive lottery administrative information 802, which may include information about the administration of the lottery including types of games, their locations, prize distributions etc. The lottery information management store 812 may further receive lottery regulator information 804, which may include regulatory information about retailers involved in the sale of the lottery tickets. The lottery information management store 812 may further receive the transaction information 808 describing transactions that occur in the lottery system. The lottery information management store 812 may further receive lottery corporation enterprise resource planning (ERP) information, which may include employee information, user and role identification information etc.

The lottery information management store 812 may be accessed by various personnel for various reasons. For example, the information store 812 may be analyzed for marketing purposes, to perform audits 816, forensic analysis 818 as well as prize claim investigations 820.

The systems and methods described above provide functionality for managing lottery information, including linking related transactions together, and locating all related transactions. The system and methods described herein have been described with reference to various examples. It will be appreciated that components from the various examples may be combined together, or components of the examples removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

What is claimed is:

1. A method for managing transaction information in a lottery system for facilitating a subsequent prize investigation in the lottery system, the method comprising:
   receiving, at a server, a transaction associated with a ticketing event in the lottery system, the transaction comprising a unique identifier (uTID) and transaction information associated with the ticketing event, the transaction information comprising a category type of the ticketing event;
   determining if the received transaction should be linked back to related transactions of previous ticketing events by comparing the category type of the ticketing event associated with the received transaction to one of a plurality of predefined category types of possible ticketing events that may occur in the lottery system that can be associated with previous transactions;

when it is determined that the received transaction should be linked back to related transactions of previous ticketing events, determining a previous related transaction associated with a unique identifier (uTID) from at least a portion of the transaction information of the received transaction;

storing, at the server, a link between the uTID of the received transaction and the uTID of the related transaction; and subsequent to storing the link between the received transaction and related transaction, providing support in a prize investigation in the lottery system comprising:

receiving a target uTID associated with a ticketing event having a VALIDATION category type for a winning ticket;

determining one or more previous transactions, each associated with a respective uTID having a stored link to the target uTID;

determining any subsequent transactions, each associated with a respective uTID having a stored link to any of the respective uTIDs of the determined one or more previous transactions;

retrieving transaction information associated with each non-duplicate uTIDs from a set of uTIDs comprising the target uTID, the respective uTIDs of the one or more previous transactions linked to the target uTID and the respective uTIDs of any subsequent transactions linked to any of the one or more previous transactions; and presenting at least a portion of the retrieved transaction information to an investigator.

2. The method of claim 1, further comprising storing the received transaction comprising the uTID and transaction information.

3. The method of claim 1, wherein determining the previous related transaction comprises:

determining a transaction category type identifier of a possible ticketing event that can be linked back to the received transaction; and searching for the previous related transaction using the determined transaction category type identifier and at least a portion of the transaction information.

4. The method of claim 1, wherein the transaction category type identifier of the possible ticketing event that can be linked back to the received transaction is a subset of the plurality of predefined possible category types for a transaction.

5. The method of claim 4, wherein the predefined possible category types comprises one or more of:

validation-to-original wager for linking a validation of a wager with the wager;

free wager-to-validation for linking a free wager prize with validation of the wager winning the free wager;

exchange-to-validation for linking an exchange wager to validation of the wager associated with the exchange wager;

repurchase-to-validation for linking a repurchase of a wager to validation of the wager;

promoX-to-promoY for linking a wager received as a promotion for buying another wager;

cancel-to-original wager for linking a cancellation of a wager to the wager;

reprint-to-original wager for linking a reprinting of a wager to the wager; and reissue-to-original wager for linking a reissuing of a wager to the wager.

6. The method of claim 1, wherein the received transaction is received in real-time or near-real time from a retail location or wherein the received transaction is received from a batch of a plurality of transactions temporarily stored from a plurality of retail locations.

7. The method of claim 1, wherein linked transactions are stored as a row in a linked transaction database table, the row associating a uTID to a linked uTID.

8. The method of claim 1, further comprising receiving the target uTID or determining the target uTID from received transaction information.

9. A lottery information management system for facilitating a subsequent prize investigation, the system comprising:

at least one processing unit for executing instructions; and at least one memory unit for storing instructions, the instructions when executed by the at least one processing unit configuring the system to provide a method for managing transaction information in a lottery system, the method comprising:

receive, at a server, a transaction associated with a ticketing event in the lottery system, the transaction comprising a unique identifier (uTID) and transaction information associated with the ticketing event, the transaction information comprising a category type of the ticketing event;

determine if the received transaction should be linked back to related transactions of previous ticketing events by comparing the category type of the ticketing event associated with the received transaction to one of a plurality of predefined category types of possible ticketing events that may occur in the lottery system that can be associated with previous transactions;

when it is determined that the received transaction should be linked back to related transactions of previous ticketing events, determine a previous related transaction associated with a unique identifier (uTID) from at least a portion of the transaction information of the received transaction;

store, at the server, a link between the uTID of the received transaction and the uTID of the related transaction; and subsequent to storing the link between the received transaction and related transaction, provide support in a prize investigation in the lottery system comprising:

receive a target uTID associated with a ticketing event having a VALIDATION category type for a winning ticket;

determine one or more previous transactions, each associated with a respective uTID having a stored link to the target uTID;

determine any subsequent transactions, each associated with a respective uTID having a stored link to any of the respective uTIDs of the determined one or more previous transactions;

retrieve transaction information associated with each non-duplicate uTIDs from a set of uTIDs comprising the target uTID, the respective uTIDs of the one or more previous transactions linked to the target uTID and the respective uTIDs of any subsequent transactions linked to any of the one or more previous transactions; and present at least a portion of the retrieved transaction information to an investigator.

10. The system of claim 9, wherein the instructions further configure the system to store the received transaction comprising the uTID and transaction information.

11. The system of claim 9, wherein the instructions for configuring the system to determine the previous related transaction comprise instructions for configuring the system to:
  determine a transaction category type identifier of a possible ticketing event that can be linked back to the received transaction; and
  search for the previous related transaction using the determined transaction category type identifier and at least a portion of the transaction information.

12. The system of claim 9, wherein the transaction category type identifier of the possible ticketing event that can be linked back to the received transaction is a subset of the plurality of predefined possible category types for a transaction.

13. The system of claim 12, wherein the predefined possible category types comprises one or more of:
  validation-to-original wager for linking a validation of a wager with the wager;
  free wager-to-validation for linking a free wager prize with validation of the wager winning the free wager;
  exchange-to-validation for linking an exchange wager to validation of the wager associated with the exchange wager;
  repurchase-to-validation for linking a repurchase of a wager to validation of the wager;
  promoX-to-promoY for linking a wager received as a promotion for buying another wager;
  cancel-to-original wager for linking a cancellation of a wager to the wager;
  reprint-to-original wager for linking a reprinting of a wager to the wager; and
  reissue-to-original wager for linking a reissuing of a wager to the wager.

14. The system of claim 9, wherein the received transaction is received in real-time or near-real time from a retail location or wherein the received transaction is received from a batch of a plurality of transactions temporarily stored from a plurality of retail locations.

15. The system of claim 9, wherein linked transactions are stored as a row in a linked transaction database table, the row associating a uTID to a linked uTID.

16. The system of claim 9, further comprising instructions for configuring the system to receive the target uTID or determine the target uTID from received transaction information.

* * * * *